(12) United States Patent
Odle et al.

(10) Patent No.: US 8,366,050 B2
(45) Date of Patent: Feb. 5, 2013

(54) BLENDED WING BODY CARGO AIRPLANE

(75) Inventors: Richard C. Odle, Long Beach, CA (US); Dino Roman, Lake Forest, CA (US); Blaine Knight Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 12/623,404

(22) Filed: Nov. 21, 2009

(65) Prior Publication Data

US 2011/0121130 A1    May 26, 2011

(51) Int. Cl.
*B64C 1/22* (2006.01)
(52) U.S. Cl. ........ 244/137.1; 244/37; 244/119; 244/120
(58) Field of Classification Search .................... 244/36, 244/137.1, 119, 120, 123.1, 124
See application file for complete search history.

(56) References Cited

U.S. PATENT DOCUMENTS

| | | | |
|---|---|---|---|
| 2,406,506 A * | 8/1946 | Northrop ......................... | 244/13 |
| 2,412,646 A * | 12/1946 | Northrop et al. ................ | 244/13 |
| 2,926,869 A | 3/1960 | Sullivan | |
| 2,942,812 A | 6/1960 | Pauli | |
| 3,486,719 A * | 12/1969 | Bock et al. ....................... | 244/25 |
| 4,088,288 A * | 5/1978 | Barnes ........................ | 244/137.1 |
| 5,022,610 A * | 6/1991 | Ensign ........................ | 244/118.3 |
| 5,082,204 A * | 1/1992 | Croston ........................ | 244/126 |
| 5,318,249 A * | 6/1994 | Stoner .......................... | 244/35 R |
| 5,893,535 A * | 4/1999 | Hawley ........................ | 244/119 |
| 5,909,858 A * | 6/1999 | Hawley ........................ | 244/36 |
| 6,568,632 B2 * | 5/2003 | Page et al. ........................ | 244/36 |
| 6,595,466 B2 * | 7/2003 | Depeige et al. ............. | 244/118.3 |
| 6,708,924 B2 * | 3/2004 | Page et al. ........................ | 244/36 |
| 6,923,403 B1 * | 8/2005 | Dizdarevic et al. ............. | 244/13 |
| 7,093,798 B2 | 8/2006 | Whelan et al. | |
| 7,344,109 B1 | 3/2008 | Rezai | |
| 7,793,884 B2 * | 9/2010 | Dizdarevic et al. ............. | 244/36 |
| 8,056,852 B1 * | 11/2011 | Dizdarevic et al. ............. | 244/36 |
| 2002/0063187 A1 | 5/2002 | Depeige et al. | |
| 2002/0145075 A1 * | 10/2002 | Page et al. ........................ | 244/36 |
| 2003/0192986 A1 * | 10/2003 | Page et al. ........................ | 244/36 |
| 2004/0195454 A1 * | 10/2004 | Page et al. ..................... | 244/120 |
| 2010/0123047 A1 * | 5/2010 | Williams ................... | 244/35 R |
| 2010/0163670 A1 * | 7/2010 | Dizdarevic et al. ............. | 244/36 |

FOREIGN PATENT DOCUMENTS

| | | |
|---|---|---|
| EP | 1099626 A1 | 5/2001 |
| EP | 1247734 A2 | 10/2002 |
| FR | EP 2909358 A1 | 6/2008 |
| FR | EP 2915460 A1 | 10/2008 |

OTHER PUBLICATIONS

International Search Report and Written Opinion mailed on Jan. 7, 2011 for PCT Application No. PCT/US2010/049379 filed on Sep. 17, 2010—International Search Authority—European Patent Office.

* cited by examiner

*Primary Examiner* — Philip J Bonzell
(74) *Attorney, Agent, or Firm* — Ameh IP; Elahe Toosi; Lowell Campbell

(57) ABSTRACT

A blended wing body cargo aircraft is disclosed. A body section defines a cargo volume, where an outer surface of the body section is shaped to provide an aerodynamic lifting surface. A cargo door and ramp structure is located in an aft end of the body section and is shaped to conform to an outer shape of the aerodynamic lifting surface when in a closed position. A control surface has a slightly cambered downward shape, and is positioned substantially near an aft end of the cargo door and ramp structure.

21 Claims, 11 Drawing Sheets

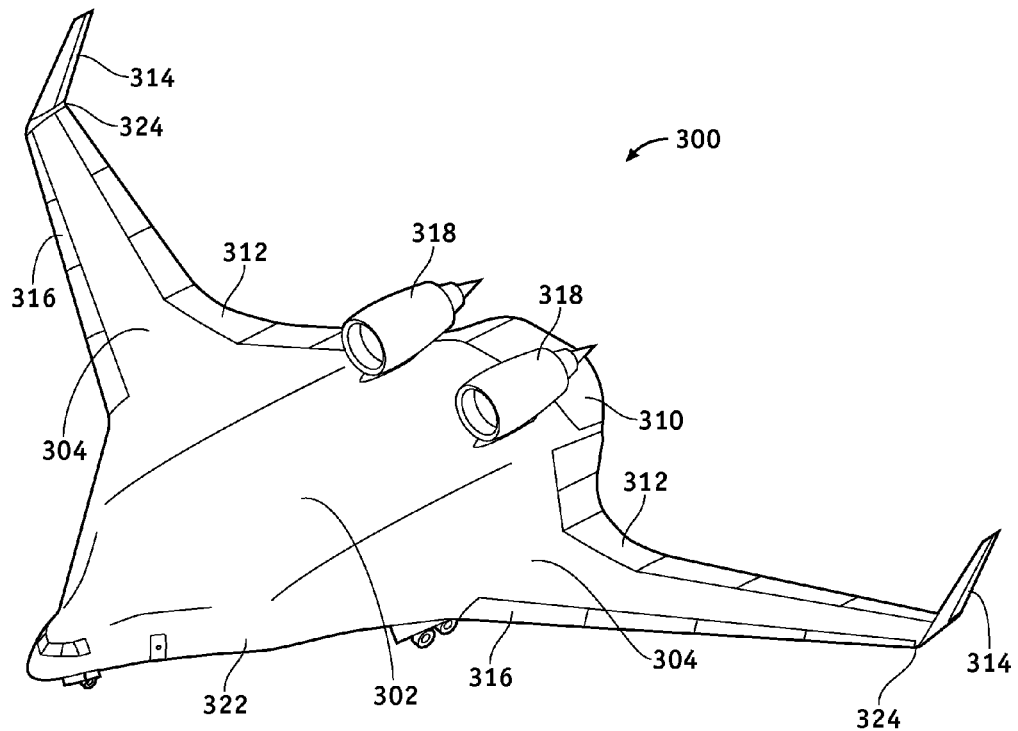
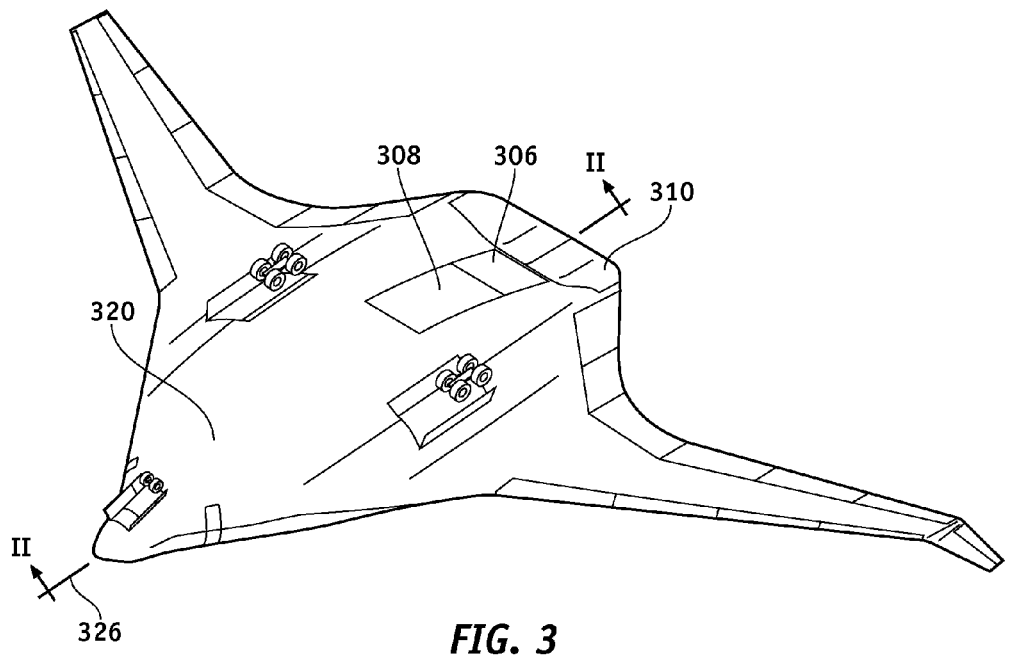
FIG. 3

|  | C-130 | C-141B | C-5B | BWB |
|---|---|---|---|---|
| MAXIMUM PAYLOAD (lb) | 33,561 | 54,256 | 218,393 | 80,000 |
| PLANNING PAYLOAD (lb) | 24,000 | 38,000 | 143,000 | 80,000 |
| PLANNING/MAX PAYLOAD | 72% | 70% | 65% | 100% |
| PLANNING PAYLOAD/PALLET (lb) | 4000 | 2923 | 3972 | 4278 |
| 463L PALLET POSITIONS | 6 | 13 | 36 | 18.7 |

FIG. 5

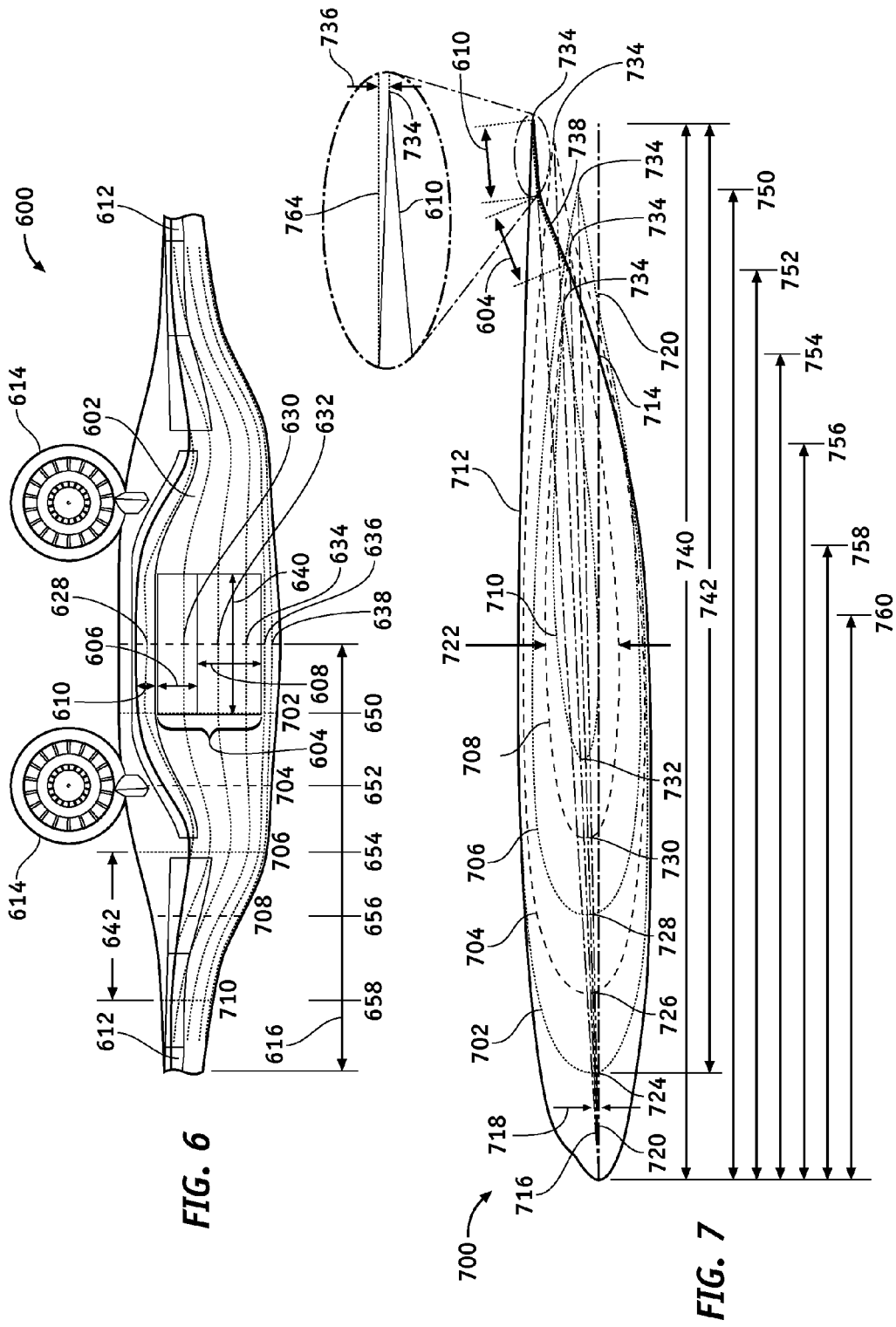

BLENDED WING BODY CARGO AIRPLANE

GOVERNMENT RIGHTS

This invention was made with Government support under Contract Number F33615-00-D-3052 awarded by The Air Force. The government has certain rights in this invention.

FIELD

Embodiments of the present disclosure relate generally to aircraft, and more particularly relate to blended wing body aircraft.

BACKGROUND

In the art of commercial airplanes, it is highly desirable to design airplane and engine configurations that yield reduced fuel burn to increase efficiency and lower cost. In addition, carbon trading regulations comparable to those already enacted in the European Union may also likely to be adopted in other industrialized nations including the United States. These environmental considerations become even more important in economic scenarios in which fuel cost increases. This motivates a need for step-change technologies to reduce fuel consumption.

Conventional military cargo airplane configurations address two disparate missions: devise a military cargo airplane that provides more fuel-efficient transport of cargo in typical operations; and provide a means to load large wheeled vehicles into the airplane without the use of ground-based equipment. In general, these airplanes have a requirement to carry a large, dense and heavy payload. For example, an existing cargo plane can carry a main battle tank that weighs about 160,000 lb and has floor space to carry 18 cargo pallets. These pallets typically have a weight limit of about 10,000 lb each, but in actual service are typically loaded with a weight of about 5000 lb each for a typical payload weight of about 90,000 lb. This means that the existing cargo plane may not have sufficient floor area (or payload volume) to carry a pallet payload weight approaching the airplane's actual capacity. Therefore, it may be typical that too much airplane is used to fly too little payload, resulting in a relatively large fuel burn per unit of payload. A typical metric of airplane fuel efficiency and carbon dioxide emissions is payload multiplied by range divided by fuel burned (ton-miles per pound of fuel). A way to address these challenges is to take advantage of the inherent fuel efficiency of a blended wing body (BWB) configuration.

A BWB is an airframe design that incorporates design features from both traditional fuselage and wing design, and flying wing design. Advantages of the BWB approach include efficient high-lift wings and a wide airfoil-shaped body. BWB aircraft have a flattened and airfoil shaped body (i.e., relative to a conventional aircraft), which produces lift (i.e., in addition to wing lift) to keep itself aloft. Flying wing designs comprise a continuous wing incorporating the functions of a fuselage in the continuous wing. Unlike a flying wing, the BWB has wing structures that are distinct and separate from the fuselage, although the wings are smoothly blended with the body. The efficient high-lift wings and wide airfoil-shaped body enable the entire craft to contribute to lift generation with the resultant potential increase in fuel economy.

BWB freighter designs are not currently being manufactured. Of the existing designs, most use large cargo doors in the centerbody leading edge. The chief disadvantage and limitation of this arrangement is that rolling stock can only be loaded with extensive ground-based cargo handling equipment. It would be preferable to have a rear (aft) cargo ramp in order to load large wheeled vehicles that can drive up the ramp. Existing BWB designs lack an airframe design that can incorporate a rear cargo door and ramp into the BWB configuration without disrupting aerodynamic performance. Integration of a rear cargo door and ramp into a BWB configuration may require preserving favorable lift distribution, avoiding separation of airflow over the BWB, and preserving pitch trim stability and control capability.

Thus, there is a need for a rear (aft) cargo door and ramp access for blended wing body airframes that does not reduce aerodynamic performance, stability, and control capability.

SUMMARY

A blended wing body aircraft comprising a rear (aft) cargo door and ramp structure is disclosed. A body section defines a cargo volume, and an outer surface of the body section and coupled wing sections are shaped to provide an aerodynamic lifting surface. A cargo door and ramp are located in an aft end of the body section and conform to an outer shape of the aerodynamic lifting surface when in a closed position. The rear cargo door and ramp are integrated into the blended wing body aircraft with an optimal upsweep that preserves favorable lift distribution and substantially avoids separation of airflow over the wing and body sections. A slightly cambered down control surface located on the body section aft of the cargo door compensates for a possible decrease of lift from integration of the cargo door and ramp into the aft end of the body section. The control surface preserves pitch trim stability and control capability, and allows near optimal aerodynamic lift distribution.

In a first embodiment, a cargo door and ramp structure is integrated into a blended wing body aircraft while maintaining aerodynamic efficiency. A body section encloses a cargo volume, and an outer surface of the body section is shaped to provide an aerodynamic lifting surface. A cargo door and ramp structure is located in an aft end of the body section, and shaped to conform to the aerodynamic lifting surface when in a closed position. At least one pitch control surface has a slightly cambered downward shape and is positioned substantially near an aft end of the cargo door and ramp structure to provide aerodynamic pitch control.

In a second embodiment, an aerodynamic lifting body incorporates an integrated cargo door and ramp structure that maintains aerodynamic efficiency. A plurality of airfoil sections are located at respective span locations of the aerodynamic lifting body and enclose a cargo volume. The cargo door and ramp structure is located at an aft end of the airfoil sections and shaped to conform to outer contours of the airfoil sections when in a closed position. At least one pitch control surface has a slightly cambered downward shape, and embodies one or more trailing edges of the airfoil sections. The pitch control surface provides pitch control for aerodynamic trim of the aerodynamic lifting body.

In a third embodiment, a method of forming a blended wing body cargo aircraft that incorporates a cargo door and ramp structure while maintaining aerodynamic efficiency is disclosed. A body section defining a cargo volume is provided, and an outer surface of the body section is shaped to provide an aerodynamic lifting surface. A cargo door and ramp structure is located in an aft end of the body section and shaped to conform to an outer shape of the aerodynamic lifting surface when in a closed position. At least one control surface has a slightly cambered downward shape and is positioned near an aft end of the cargo door and ramp structure.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

FIG. 3 is an illustration of a trimetric upper view and a trimetric lower view of an exemplary blended wing body aircraft according to an embodiment of the disclosure.

FIG. 5 is a table of maximum and planning payloads of an exemplary blended wing body aircraft according to an embodiment of the disclosure in comparison with a C-130, a C-141B, and a C-5B aircraft.

FIG. 6 is an illustration of a rear view of an exemplary blended wing body aircraft showing an exemplary cargo door and ramp structure according to an embodiment of the disclosure.

FIG. 7 is an illustration of exemplary side view of a blended wing body aircraft showing airfoil sections corresponding to FIG. 6 according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft control systems, aerodynamics, structural design, and other functional aspects of the systems (and the individual operating components of the systems) may not be described in detail herein. In addition, those skilled in the art will appreciate that embodiments of the present disclosure may be practiced in conjunction with a variety of different aircraft control systems, electrical systems, control surfaces, and aircraft blended wing body configurations. In addition, those skilled in the art will appreciate that that the system described herein is merely one example embodiment of the disclosure.

Embodiments of the disclosure are described herein in the context of a practical non-limiting application, namely, a blended wing body cargo aircraft. Embodiments of the disclosure, however, are not limited to such blended wing body cargo applications, and the techniques described herein may also be utilized in other aviation applications. For example, embodiments may be applicable to flying wings, lifting bodies, blended wing body passenger aircraft, blended wing body combined passenger/cargo aircraft, and the like.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

Figure 1:
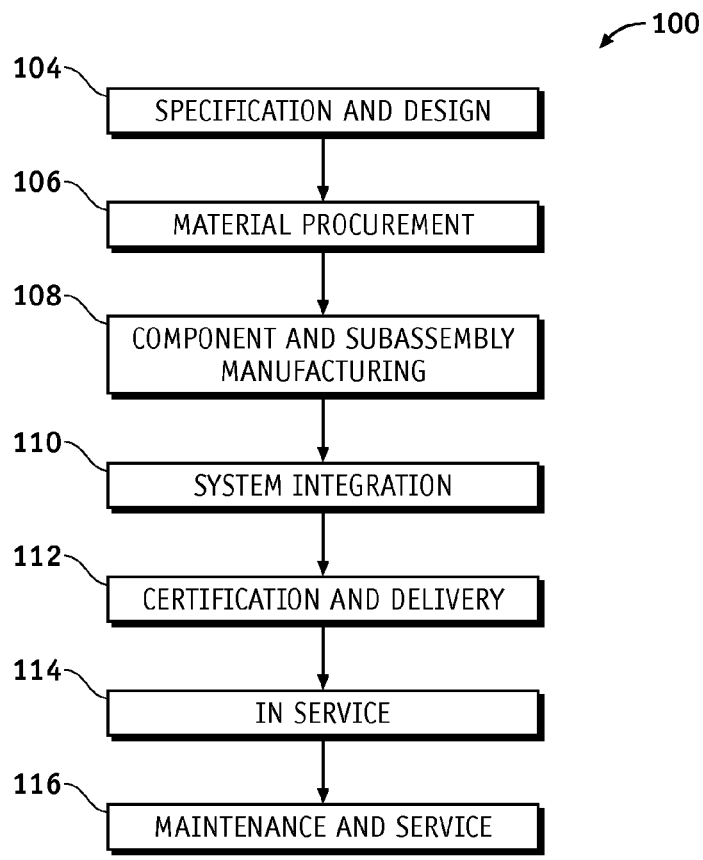
FIG. 1 is an illustration of a flow diagram of an exemplary aircraft production and service methodology.
Figure 2:
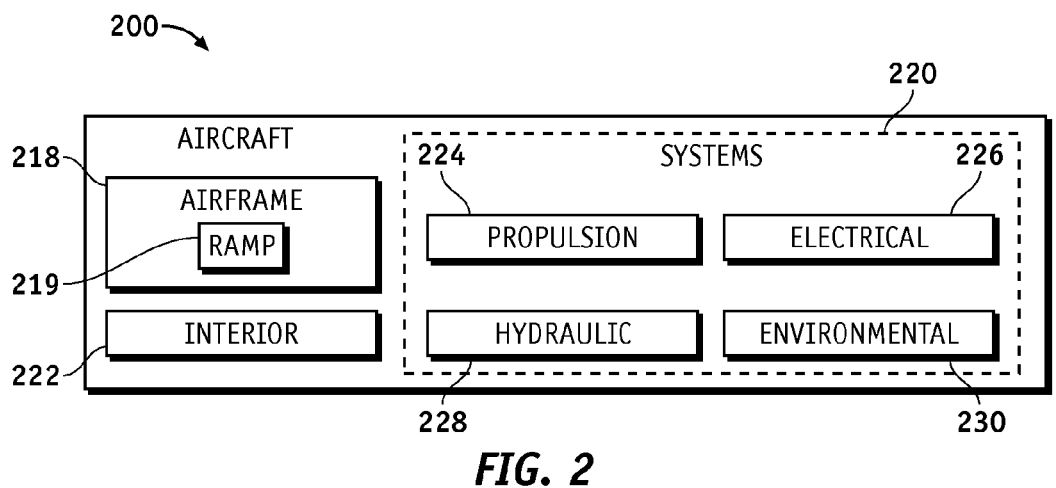
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. The airframe 218 may include a ramp 219. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. Also, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example but without limitation, to maintenance and service 116.

FIG. 3 is an illustration of a trimetric upper view and a trimetric lower of an exemplary blended wing body aircraft 300 (BWB 300) according to an embodiment of the disclosure. The BWB 300 comprises a body section 302 (centerbody 302) defining a cargo volume 1004 (FIG. 10), blended wing sections 304, a cargo door 306, a cargo ramp 308, one or more pitch control surfaces 310, ailerons 312, vertical stabilizers (winglets) 314, leading edge control surfaces 316, and engines 318.

Figure 10:
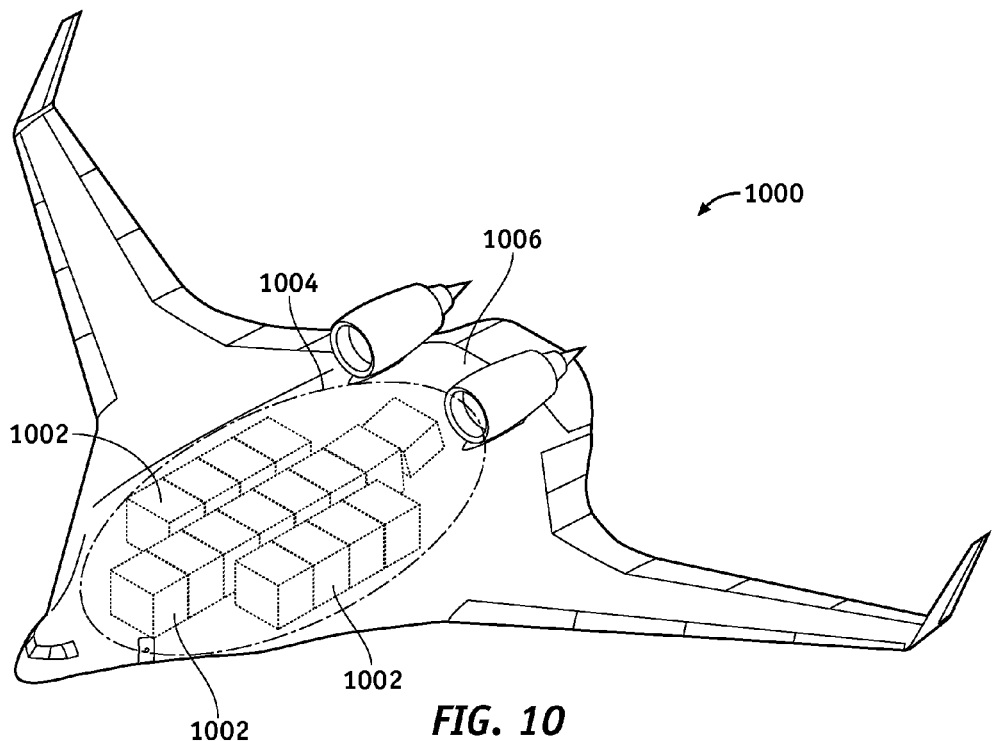
FIG. 10 is an illustration of a perspective view of an exemplary blended wing body aircraft showing loaded standard military 463-L pallets according to an embodiment of the disclosure.

The body section 302 defines a cargo volume 1004, and the cargo volume 1004 is interior to the body section 302/1006 as shown in FIG. 10. An outer surface of the lower centerbody 320 is shaped to provide an aerodynamic lifting surface. Hereinafter, the outer surface of the lower centerbody 320 and the aerodynamic lifting surface 320 may be used interchangeably in this document.

Each of the blended wing sections 304 may be structurally blended with the body section 302. The structural blending may maintain aerodynamic lift continuity from the blended wing sections 304 to the body section 302.

The cargo door 306 is coupled to the cargo ramp 308 and is located in an aft end of the body section 302 on the outer surface of the lower centerbody 320. The cargo door 306 is shaped to conform to (i.e., complete) an outer mold line (OML) of the aerodynamic lifting surface 320 when in a closed position to provide a positive lift. In this manner, aerodynamic efficiency of the BWB 300 is preserved as explained in more detail below.

The one or more pitch control surfaces 310 are positioned near an aft end of the cargo door 306 along a substantially same plane as the cargo door 306. The one or more pitch control surfaces 310 are slightly cambered downward to compensate for some lift that may be lost due to the cargo door 306 and the cargo ramp 308. Compensating for some of the lift that may be lost due to the cargo door 306 and the cargo ramp 308 preserves span loading of the BWB 300 in such a way as to substantially approximate an elliptic wing loading as explained in more detail below. The one or more pitch control surfaces 310 may allow a pitch down capability to keep the BWB 300 trimmed, and when the one or more pitch control surfaces 310 are at a streamline position, the BWB 300 is trimmed. The one or more pitch control surfaces 310 are operable to move up and down to pitch the BWB 300 up or down, and are configured to provide pitch control for the BWB 300 during flight. At a cruise condition, the one or more pitch control surfaces 310 may be substantially fixed to allow aerodynamic efficiency. During flight conditions such as takeoff and landing, the one or more pitch control surfaces 310 may be configured to assist in providing dynamic and static longitudinal stability.

The ailerons 312, the vertical stabilizers 314, and the leading edge control surfaces 316 may be configured to provide various longitudinal and lateral flight control functions suitable for operation of the BWB 300.

Engine 318 may be at least one engine suitable to provide the thrust required. For example but without limitation, engine 318 may be at least one turbo fan engine suitable to provide 55,000 lbs of thrust. In the embodiment shown in FIG. 3, engine 318 is shown for two engines mounted at two locations on the body section 302. Alternatively, more than two engines or less than two single engines may be used. In some embodiments, no engines may be used such as for BWB military cargo gliders.

Figure 4:
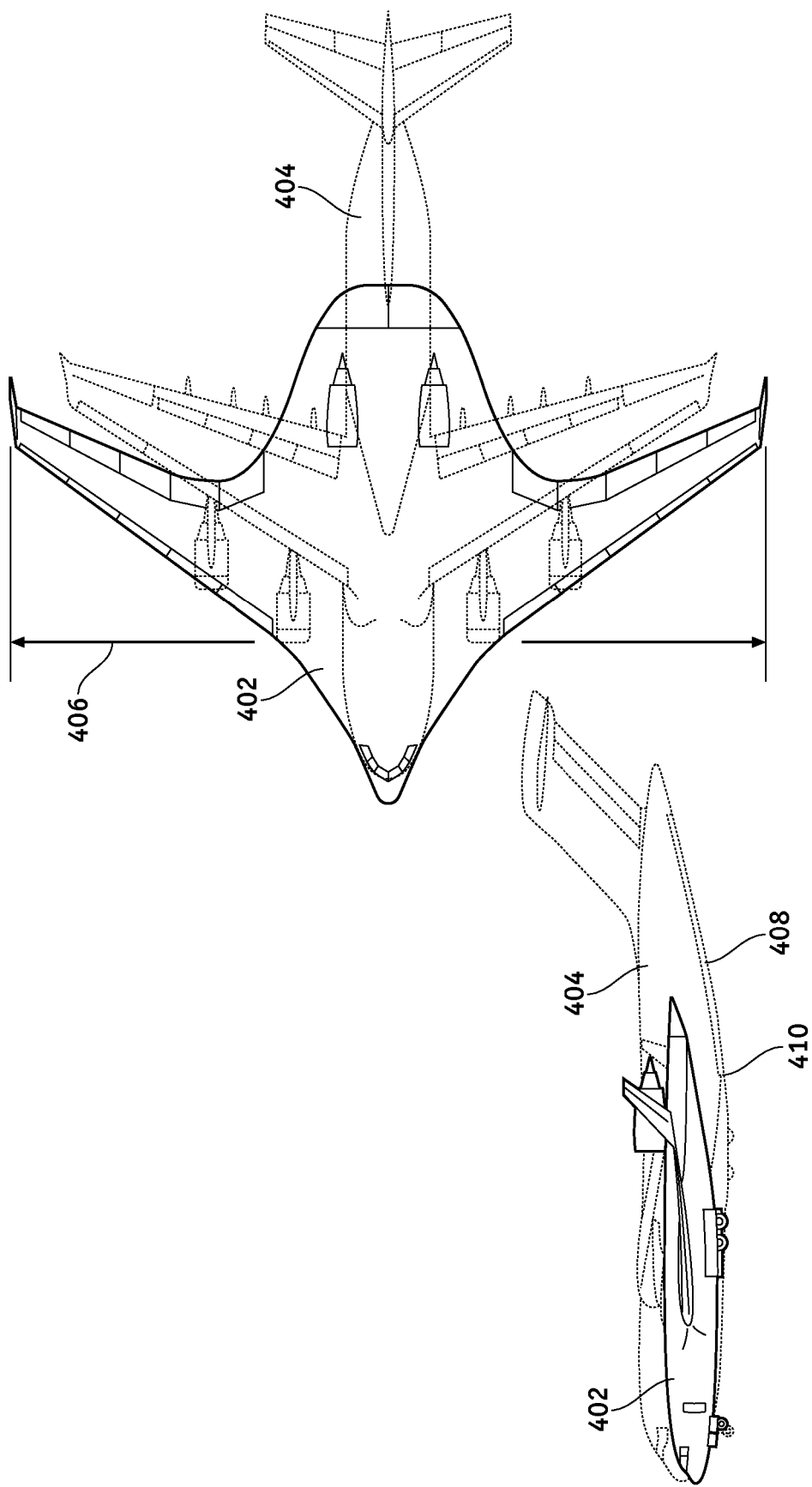
FIG. 4 is an illustration of a trimetric upper view and a trimetric side view of an exemplary blended wing body aircraft according to an embodiment of the disclosure in comparison with a military cargo airplane at the same scale.

FIG. 4 is an illustration of a trimetric upper view and a trimetric side view of an exemplary blended wing body aircraft 402 according to an embodiment of the disclosure in comparison with an existing military cargo airplane 404 at the same scale. A compact form of the blended wing body aircraft 402 is especially apparent in the side view. A larger span 406 of the blended wing body aircraft 402 is apparent in the upper view. Despite its compact size, the blended wing body aircraft 402 can carry at least as many 463-L pallets as the existing military cargo airplane 404 (i.e., about 0.7 of a pallet more).

Some existing cargo planes comprise the C-130, C-141 (now removed from service), and C-5. These airplanes generally use a conventional military cargo airplane configuration characterized by a longitudinal approximately cylindrical fuselage, a discrete high-mounted wing, and a discrete tail mounted to the aft end of the fuselage. An aft portion of the fuselage of these existing military cargo airplanes sweeps substantially sharply upward to provide clearance for large loads. A first portion of the lower aft fuselage is hinged at its forward edge to become a ramp. Behind the ramp, a second portion of the lower aft fuselage is hinged at its aft edge to become an upward-opening door. When the first and second portions are open, there is clearance for tall vehicles or other loads to enter the fuselage. Another existing solution is a commercial cargo airplane derived from an airliner and applied to military operations.

The design of the conventional airplane can be changed to increase an area available for pallet cargo. A typical way to do this is to lengthen ("stretch") the fuselage. In the case of an existing military cargo plane, for example, the cargo area of the fuselage could be stretched about 75% in length to enable a full load of typical pallets. Despite the value of this approach, it is generally rarely done because the additional weight and length of the fuselage have drawbacks. The additional weight of the fuselage subtracts from the weight of the payload, reducing the maximum payload of the airplane. Also, an increase in fuselage length may result in decreased takeoff rotation clearance between the aft fuselage and runway, which may not be optimal for takeoff performance. To reduce takeoff rotation clearance issues, the landing gear can be lengthened but this may result in a higher cargo floor and a longer and heavier cargo ramp. Furthermore, a longer fuselage may result in more aerodynamic drag, increased fuel burn and reduced range. Thus, existing military cargo airplanes may carry less than a full complement of fully loaded pallets.

A conventional aft ramp and cargo door of existing military cargo airplanes can work for loading and unloading cargo. A disadvantage of the conventional aft ramp and cargo door is the upsweep 408 (beginning near a lower ramp hinge 410) required in the aft fuselage shape to provide loading clearance. The upsweep 408 may produce flow separation in the aerodynamic flow aft of the wing, resulting in extra drag in comparison with similar airplanes without the upsweep 408. Modified commercial airliners are also available in freighter versions some of which are used in military operations. These airplanes lack an aft cargo ramp and door. As a result, they have substantially less upsweep 408 in the aft fuselage and less fuselage drag. A disadvantage and limitation of these freighters in a military role is that wheeled vehicles ("rolling stock") cannot be loaded without extensive ground-based cargo handling equipment.

FIG. 5 is a table 500 of maximum and planning payloads of an exemplary blended wing body (BWB) aircraft 508 according to an embodiment of the disclosure in comparison with a C-130 aircraft 502, a C-141B aircraft 504, and a C-5B aircraft 506. A BWB aircraft such as the BWB 402 (FIG. 4) is configured to load and unload the same amount of weight in the form of vehicles and can carry the same weight on a standardized pallet, thereby maximizing the amount of cargo for a transport mission. Existing aircraft may not perform this function. For example, an existing aircraft 404 may carry 100,000 lbs in the form of a vehicle; however, their volume may be limited and may carry 30,000 lbs in a form of standardized pallets. As shown in FIG. 5, the BWB aircraft 508 has, for example but without limitation, a maximum payload 510 of about 80,000 lbs, and a planning payload 512 of about 80,000 lbs, thereby the BWB 508 can carry up to about 100% 514 of its maximum payload 510. In contrast, other aircraft such as the C-130 aircraft 502, the C-141B aircraft 504, and the C-5B aircraft 506 may carry up to about 72% 516, about 70% 518, and about 65% 520 of their maximum payloads 522/524/526 respectively.

FIG. 6 is an illustration of a rear view of an exemplary blended wing body aircraft 600 (BWB 600) showing an exemplary cargo door and ramp structure according to an embodiment of the disclosure. FIG. 7 is an illustration of exemplary side view of a blended wing body aircraft 700 (BWB 700) showing airfoil sections corresponding to FIG. 6 according to an embodiment of the disclosure. BWB 600 comprises a body section 602 defining the cargo volume 1004 (FIG. 10), a cargo door and ramp structure 604 comprising: a cargo door 606, and a cargo ramp 608, one or more pitch control surfaces 610, blended wing sections 612, and engine 614. The BWB 600 comprises a structure that is similar to the BWB 300, common features, functions, and elements will not be redundantly described herein.

Figure 11:
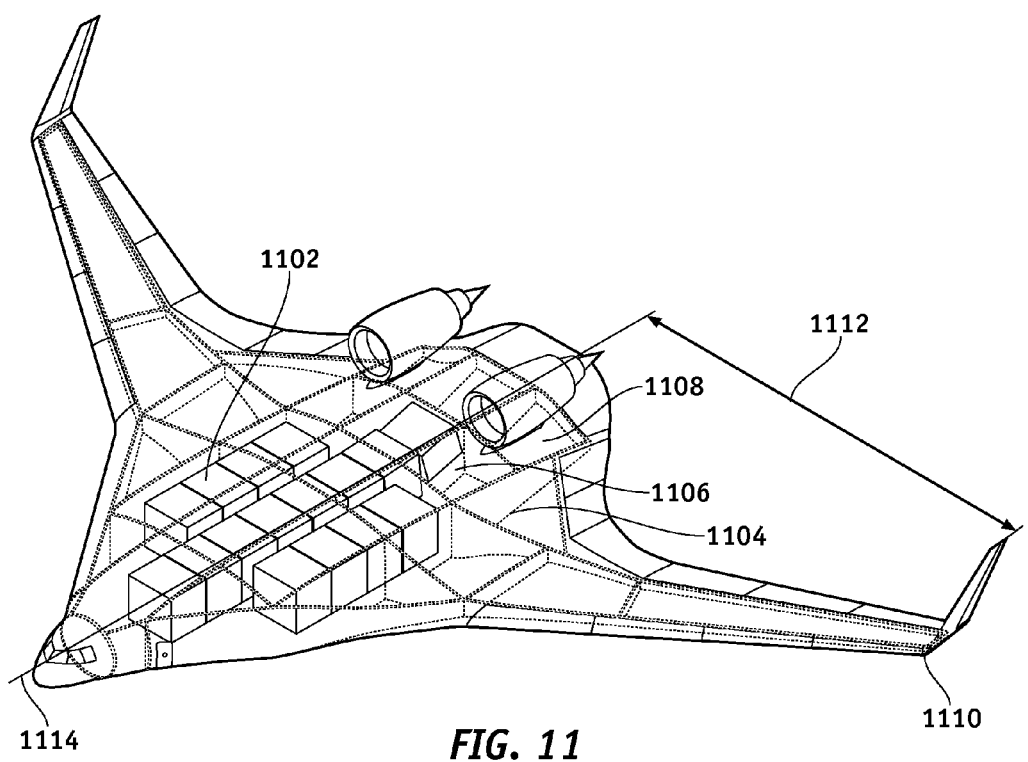
FIG. 11 is an illustration of a schematic transparent trimetric view of the exemplary blended wing body aircraft of FIG. 10 showing loaded standard military 463-L pallets according to an embodiment of the disclosure.

As explained above, the cargo door and ramp structure 604 is located in an aft end of the body section 602 and is aerodynamically shaped to conform with an outer surface of the lower centerbody 320 (FIG. 3) of the body section 602 when in a closed position. In this manner, a shape of the cargo door and ramp structure 604 is conformed to the aerodynamic lifting surface 320 of the BWB 600 preserving aerodynamic efficiency of the BWB 600. For example, cross sections of the BWB 600 (airfoil sections in FIG. 7) are each shaped to conform the cargo door and ramp structure 604 to the OML of the BWB 600 forming an upsweep 738 as explained below. The upsweep 738 may, for example but without limitation, begin near a hinge 824 shown in FIG. 8. Contour lines 628, 630, 632, 634, 636, and 638 are taken in substantially parallel lateral planes (not shown) substantially perpendicular to a centerline 1114 (FIG. 11). Contour lines 628, 630, 632, 634, 636, and 638 conform to the cargo door and ramp structure 604 and may be formed at various percentages of the body length 740 of the BWB 700 (FIG. 7). For example but without limitation, the contour lines may be formed at the following percentages of the body length 740: contour line 628 may be formed at about 92.6% 750 of the body length 740; contour line 630 may be formed at about 85.2% 752 of the body length 740; contour line 632 may be formed at about 77.8% 754 of the body length 740; contour line 634 may be formed at about 70.4% 756 of the body length 740; contour line 636 may be formed at about 63% 758 of the body length 740; and contour line 638 may be formed at about 55.6% 760 of the body length 740. In this manner, contour lines 628-638 form a plurality of substantially parallel lateral planes for the cargo door and ramp structure 604. For example, the contour line 628 located at about 92.6% 750 of the body length 740 is at the aft end of the body section 602 and represents a vertical clearance 810 (FIG. 8) from the ground line 820 (FIG. 8) providing a sufficient clearance for the cargo ramp 608.

BWB 700 may comprise airfoil sections 702, 704, 706, 708, and 710, each comprising geometric parameters for shaping the cargo door and ramp structure 604. For example, airfoil section 702 comprises geometric parameters such as an upper surface 712, a lower surface 714, an angle 718 between a chord line 716 and a level line 720, a mean camber line (not shown), a maximum thickness 722 approximate location of which is shown for the airfoil section 708, and a chord length 742. A chord length defines a distance between a trailing edge and a leading edge of an air airfoil such as a distance from each of the leading edges 724-732 to the trailing edges 734 of each of the airfoils 702-710 respectively. For example, FIG. 7 shows the chord length 742 of the airfoil section 702.

In conventional tube-and-wing airliners, a "fuselage reference plane" is generally parallel to the axis of the fuselage constant section. However, in the case of blended wing bodies, the main cargo deck surface (cargo floor 828 in FIG. 8) is parallel or coplanar with the fuselage reference plane. The level line 720 may be defined as the intersection of the fuselage reference plane and the central plane of lateral symmetry. The fuselage reference plane may be set well below the airplane so that vertical coordinates are positive in sign.

The airfoil sections 702, 704, 706, 708, and 710 comprise leading edges 724, 726, 728, 730, and 732 respectively. The leading edges 724, 726, 728, 730, and 732 may be located at respective locations along the half wing span 616 of the BWB 600. For example but without limitation, the leading edge 724 may be located at about 6.2% 650, the leading edge 726 may be located at about 12.4% 652, the leading edge 728 may be located at about 18.7% 654, the leading edge 730 may be located at about 24.9% 656, and the leading edge 732 may be located at about 31.1% 658 of the half wing span 616 of the BWB 600. In some embodiments, a cargo door and ramp structure 604 may be bounded by the airfoil sections (e.g., airfoil section 702) located at about ±6.2% (e.g., about +6.2% is indicated by 650 in FIG. 6 and about −6.2% is not shown in FIG. 6) of a span 406 (FIG. 4) of the BWB 600/402.

Each of the airfoil sections 702, 704, 706, 708, and 710 may have an angle 718 between their respective chord line (such as the chord line 716) and the level line 720. The angle 718 may be, for example but without limitation, about 3.5, about 2.4, about 0.8, about 1.63, and about 2.62 degrees and the like for the airfoil sections 702, 704, 706, 708, and 710 respectively.

A shape of each of the airfoil sections 702, 704, 706, 708, and 710 can be optimized based on, for example but without limitation, spanwise tailoring of a chord length such as the chord length 742, twist, the maximum thickness 722 and location of the maximum thickness 722 as a percentage of the chord length, and the like. In this manner, the cargo door and ramp structure 604 can conform to the aerodynamic lifting surface of the BWB 600, thereby preserving the aerodynamic efficiency of the BWB 600.

A shape of an outer surface of the lower centerbody 320 may be called a "loft" of the surface. The loft may be defined by a series of cross sections (e.g., airfoil sections 702-710) of the surface. These cross sections may be taken in any orientation and a single set of parallel cross sections (e.g., airfoil sections 702-710) can define the loft with a degree of precision that depends on the spacing of the cross sections. Alternatively, multiple sets of cross sections (e.g., airfoil sections 702-710) taken parallel to different reference planes may be created to define the loft with possibly higher precision. FIG. 6 presents a series of cross sections 628-638 (contour lines) taken substantially parallel to the vertical-lateral plane (not shown) substantially perpendicular to the centerline 1114 (FIG. 11). FIG. 7 presents another series of cross sections such as airfoil sections 702-710 (comprising leading edges 724-732 respectively) taken substantially parallel to the vertical-longitudinal plane taken on the line II-II 326 (FIG. 3). A suitable combination of the airfoil sections 702-710 and the cross sections 628-638 define an aft portion of the outer surface of the lower centerbody 320 with a given precision. Additional cross sections can be interleaved between the airfoil sections 702-710 and the cross sections 628-638 to increase precision in shaping aerodynamic surfaces of the BWB 300 such as the outer surface of the lower centerbody 320.

Each of the one or more pitch control surfaces 610 is positioned near an aft end of the cargo door 606, to provide pitch control during flight. The one or more pitch control surfaces 610 occupy aft portions of some of the airfoil sections 702, 704, 706, 708, and 710 comprising the trailing edges 734. For example but without limitation, the one or more pitch control surfaces 610 (aft portions) may comprise about 15% of each of the airfoil sections 702, 704, 706, 708, and 710 respectively. Each of the one or more pitch control surfaces 610 is slightly cambered downward 736 (FIG. 7) at each of the trailing edges 734 to compensate for some of the lift that may be lost due to the cargo door and ramp structure 604 as explained in more detail below in the context of discussion of FIG. 18. For example but without limitation, the one or more pitch control surfaces 610 may be slightly cambered downward 736 by about two degrees relative to a line 764 parallel to the level line, thereby preserving span loading 1504 (FIG. 15) in such a way as to approximate an ideal elliptical span loading 1502. The one or more pitch control surfaces 610 allow pitch down capability to keep the BWB 600 trimmed. The one or more pitch control surfaces 610 provide suitable longitudinal flight control for operation of the BWB 600 as explained above.

Figure 8:
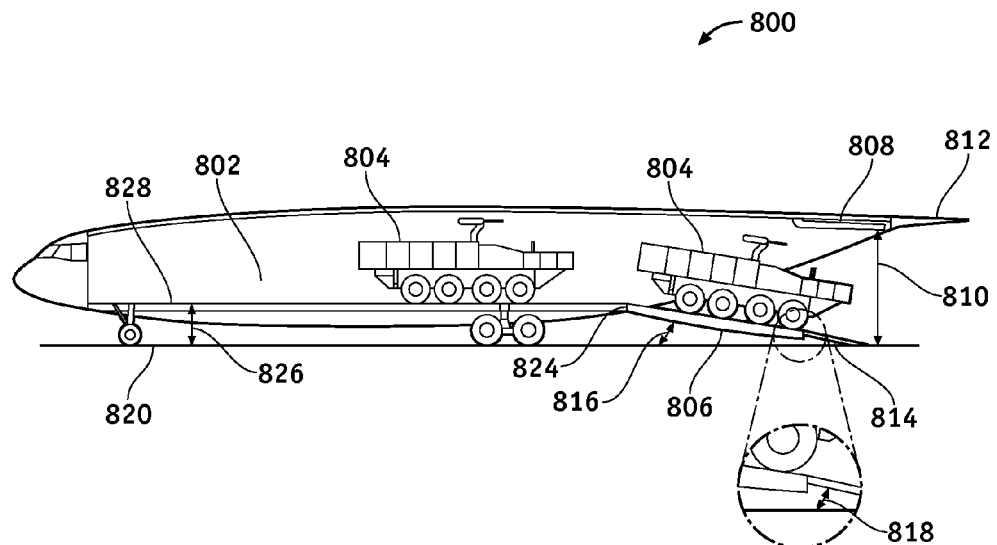
FIG. 8 is an illustration of a cross sectional view along a center cargo bay of an exemplary blended wing body aircraft showing an armored vehicle located in the center cargo bay and an armored vehicle located on a cargo ramp with a cargo door in an open position according to an embodiment of the disclosure.

FIG. 8 is an illustration of a cross sectional view along a center cargo bay 802 of an exemplary blended wing body aircraft 800 showing a Stryker armored vehicle 804 located in the center cargo bay 802, and a Stryker armored vehicle 804 located on the cargo ramp 806 with the cargo door 808 in an open position according to an embodiment of the disclosure. The vertical clearance 810 from a pitch control surface 812 to the ground line 820 may be, for example but without limitation, about 162 inches (about 411 cm). An angle 816 between the ground line 820 and the cargo ramp 806 may be, for example but without limitation, about 9 degrees, and angle 818 between an extension 814 (toe) of the cargo ramp 806 and the ground line 820 may be, for example but without limitation, about 13 degrees to provide sufficient vertical clearance 810 from the ground line 820 for loading and unloading of the vehicle and pallets.

Figure 9:
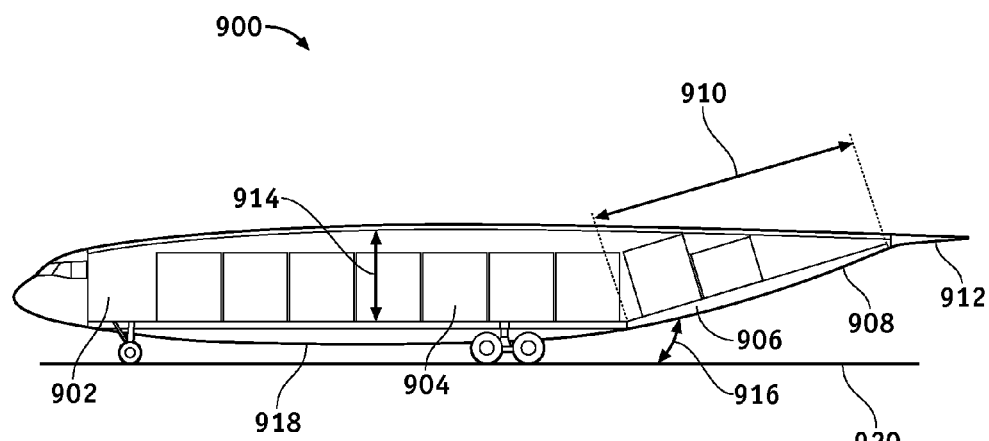
FIG. 9 is an illustration of a cross sectional view along a center cargo bay of an exemplary blended wing body aircraft showing loaded standard military 463-L pallets with a cargo door in a closed position according to an embodiment of the disclosure.

FIG. 9 is an illustration of a cross sectional view along a center cargo bay 902 of an exemplary blended wing body aircraft 900 showing loaded standard military 463-L pallets 904 (cargo 904) with a cargo door and ramp structure 910 in a closed position according to an embodiment of the disclosure. As mentioned above, a pitch control surface 912 is slightly cambered downward 736 to compensate for some of the lift that may be lost due to the cargo ramp 906 and the cargo door 908. A substantially maximum height 914 of the center cargo bay 902 may be, for example but without limitation, about 125 inches (about 318 cm). An upsweep angle 916 of the closed cargo door and ramp structure 910 relative to a ground line 920 may be, for example but without limitation, about 9 degrees.

FIG. 10 is an illustration of a perspective view of an exemplary blended wing body aircraft 1000 showing loaded standard military 463-L pallets 1002 within the cargo volume 1004 interior to the body section 1006 according to an embodiment of the disclosure.

FIG. 11 is an illustration of a schematic transparent trimetric view of the exemplary blended wing body aircraft 1100 showing loaded standard military 463-L pallets 1102, and an upsweep 1104 at a cargo ramp 1106 and a cargo door 1108 according to an embodiment of the disclosure.

Figure 12:
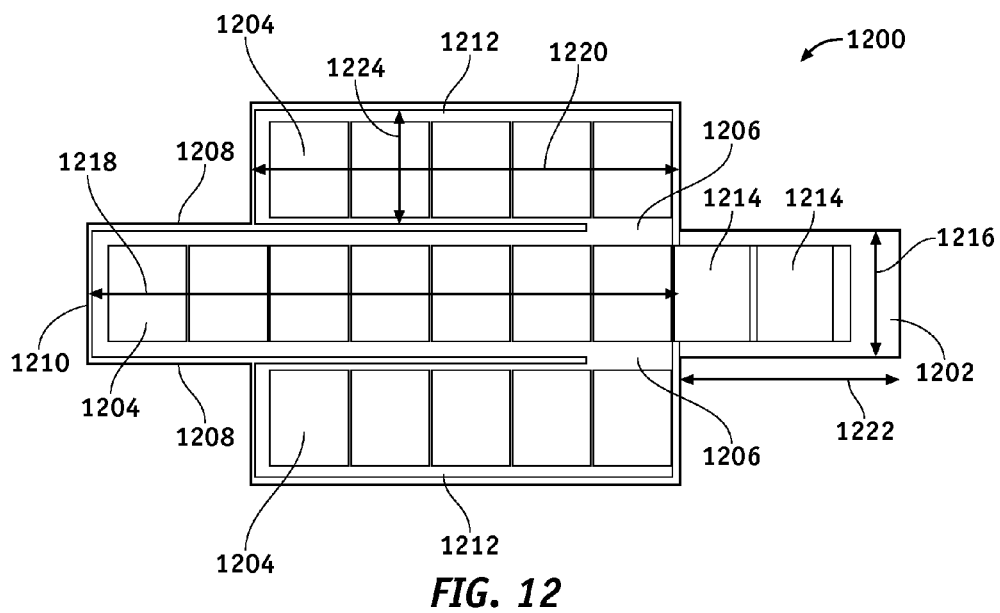
FIG. 12 is an illustration of a plan view of an exemplary blended wing body aircraft showing loaded standard military 463-L pallets according to an embodiment of the disclosure.

FIG. 12 is an illustration of a plan view of an exemplary blended wing body aircraft 1200 showing loaded standard military 463-L pallets 1204 according to an embodiment of the disclosure. Gaps 1206 in two ribs 1208 separating an inboard cargo bay 1210 and outboard cargo bays 1212 allow lateral transfer of pallets 1214 that enter from the aft ramp/door 1202. Width 1216 of the inboard cargo bay 1210 may be, for example but without limitation, about 143 inches (about 3.63 m), and length 1218 of the inboard cargo bay 1210 may be, for example but without limitation, about 656 inches (about 16.7 m). A length 1220 of the outboard cargo bays 1212 may be, for example but without limitation, about 470 inches (about 12 m). A width 1224 of the outboard cargo bays 1212 may be, for example but without limitation, about 128 inches (about 3.25 m). A length 1222 of the ramp/door 1202 may be, for example but without limitation, about 243 inches (about 6.17 m). A loadable length of the BWB 1200 may be, for example but without limitation, about 656 inches (about 16.7 m) provided by the inboard cargo bay 1210 plus the 243 inches (about 6.17 m) provided by the ramp/door 1202.

Figure 13:
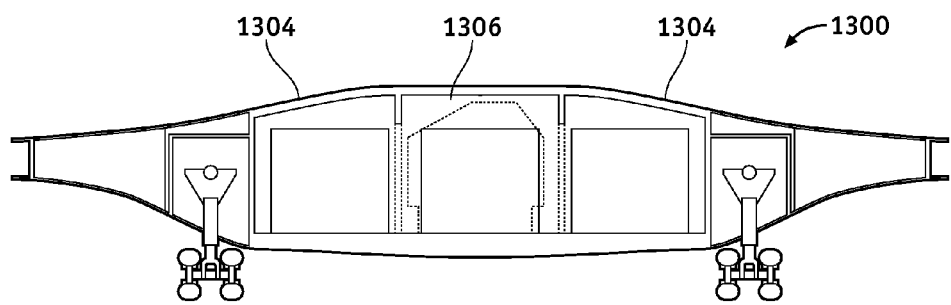
FIG. 13 is an illustration of a cross sectional view through the center body looking aft of an exemplary blended wing body aircraft showing loaded standard military 463-L pallets according to an embodiment of the disclosure.

FIG. 13 is an illustration of a cross sectional view through the centerbody 302 looking aft of an exemplary blended wing body aircraft 1300 showing loaded standard military 463-L pallets 1302 according to an embodiment of the disclosure. FIG. 13 shows three cargo bays. Height of the outboard cargo bays 1304 is less than the center cargo bay 1306. In this manner, millitary pallets (i.e., 88×108×96 inches/224×274× 244 cm) can be loaded to the outboard cargo bays 1304 while a vehicle such as the Stryker which may need a higher clearance can be loaded to the center cargo bay 1306. The blended wing body aircraft 1300 may also be used for commercial applications, such as but without limitation, fresh and preserved food transport, medicine and medical supplies delivery, mail delivery, vehicle delivery, perishable flower transport, airfreight, passengers, and the like.

Figure 14:
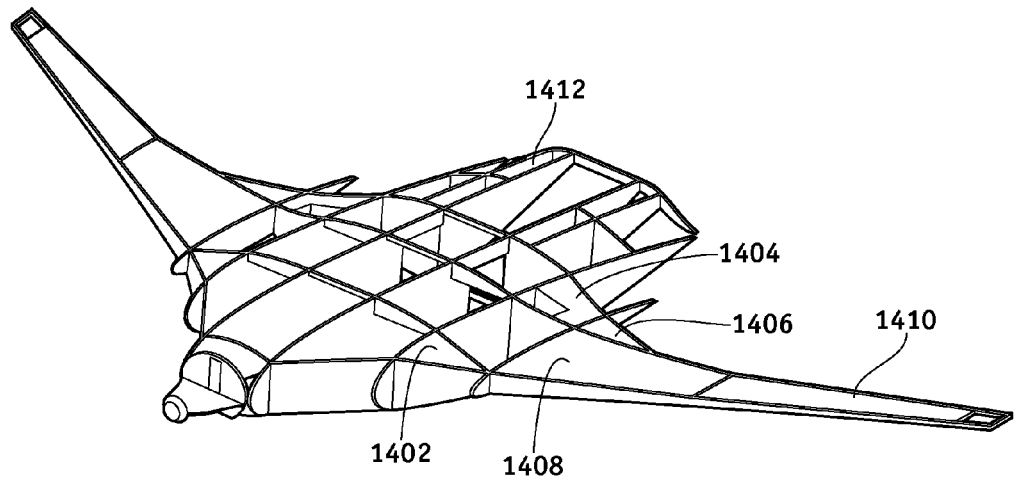
FIG. 14 is an illustration of a trimetric upper view of an exemplary blended wing body aircraft showing a fuel tank capacity according to an embodiment of the disclosure.

FIG. 14 is an illustration of a trimetric upper view of an exemplary blended wing body aircraft 1400 showing a fuel tank capacity according to an embodiment of the disclosure. The BWB 1400 may comprise a plurality of fuel tanks, such as but without limitation, fuel tank 1402, 1404, 1406, and 1408 on each blended wing 1410. In this manner, a large fuel capacity is possible with the BWB 400 incorporating a cargo door ramp structure 1412. Such a large capacity allows the BWB 1400 to have a substantial range.

Figure 15:
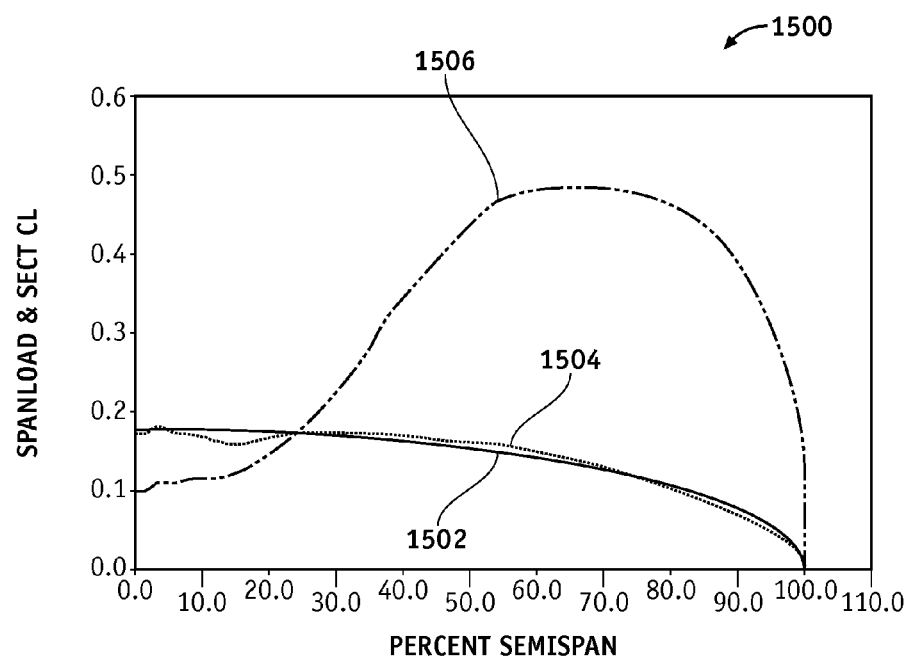
FIG. 15 is an illustration of an exemplary graph showing a percent semi-span versus span load and section lift coefficient according to an embodiment of the disclosure in comparison with an ideal elliptical span loading.

FIG. 15 is an illustration of an exemplary graph showing percent semi-span versus span load or section lift coefficient $C_L$ according to an embodiment of the disclosure in comparison with an ideal elliptical span loading. FIG. 15 shows three curves 1502, 1504, and 1506 on a plot of percent semi-span versus spanload or section lift coefficient $C_L$. The curve 1502 represents an "ideal" elliptical span loading. The curve 1504 is a lift distribution (span loading) achieved by an embodiment of the disclosure by spanwise tailoring of chord, twist, camber, and the like of airfoil sections such as the airfoil sections 702-710 (FIG. 7). The curve 1506 represents a lift coefficient of the BWB 300 across the span of the body section 302 and the blended wing sections 304. The lift coefficient near the center of the BWB 300 is low (about 0.1) and increases smoothly to a typical level of about 0.48 in a conventional outboard wing. According to various embodiments of the disclosure, a suitable combination of long inboard chords and low inboard section lift coefficients is used to provide an efficient (close to elliptic) spanloading across the wingspan 406 comprising the blended wing sections 304 and the body section 302.

Figure 16:
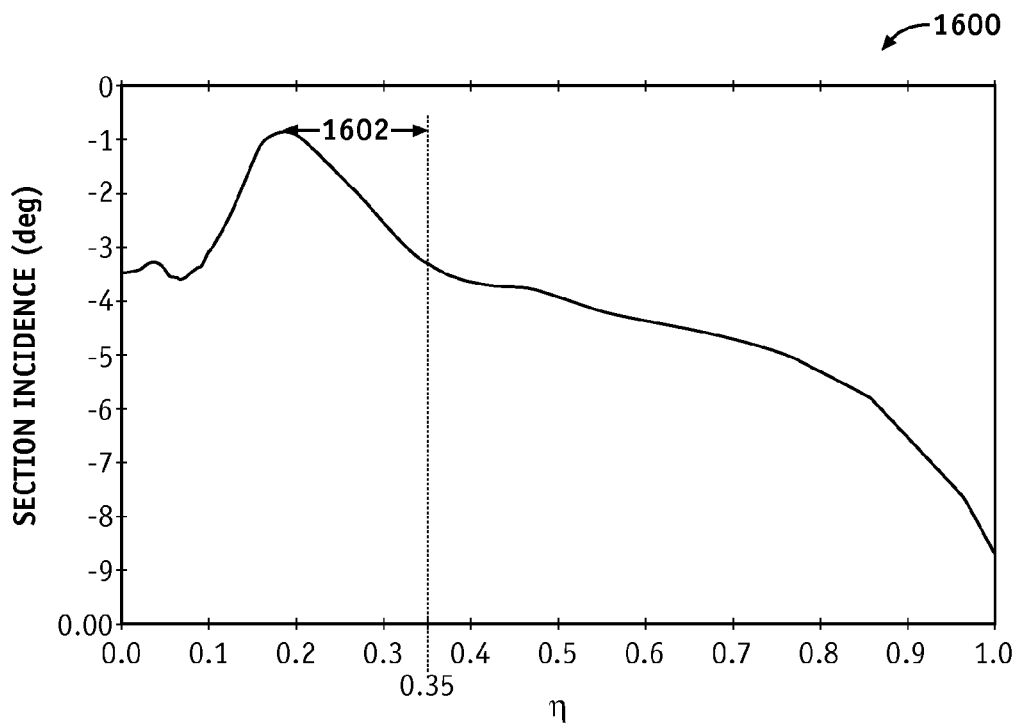
FIG. 16 is an illustration of an exemplary graph showing a twist distribution from centerline to wing tip according to an embodiment of the disclosure.

FIG. 16 is an illustration of an exemplary graph showing twist distribution from the centerline 1114 to the wing tip 1110 (FIG. 11) according to an embodiment of the disclosure. A highly tailored twist distribution, section incidence, from the centerline 1114 to the wing tip 1110 along with airfoil camber tailoring achieves the spanloading shown in FIG. 15. FIG. 16 shows, the tailoring of the twist distribution, section incidence, of a portion of the BWB 300 such as the body section 302 (FIG. 3) enclosing the cargo bays 1210/1212 (inboard of approximately 20%, i.e., η<about 0.2), and a transition region 1602 from a side of cargo bays 1210/1212 to a more conventional outboard wing (η=about 0.2 to about 0.35). The transition is an effect of integrating the upsweep 738 of the cargo door and ramp structure 604. As explained above, an inefficency in the spanloading that may be caused by the upsweep 738 of the cargo door and ramp structure 604 can be optimized by the trailing edges 734 being formed with a slightly downward camber 736.

Figure 17:
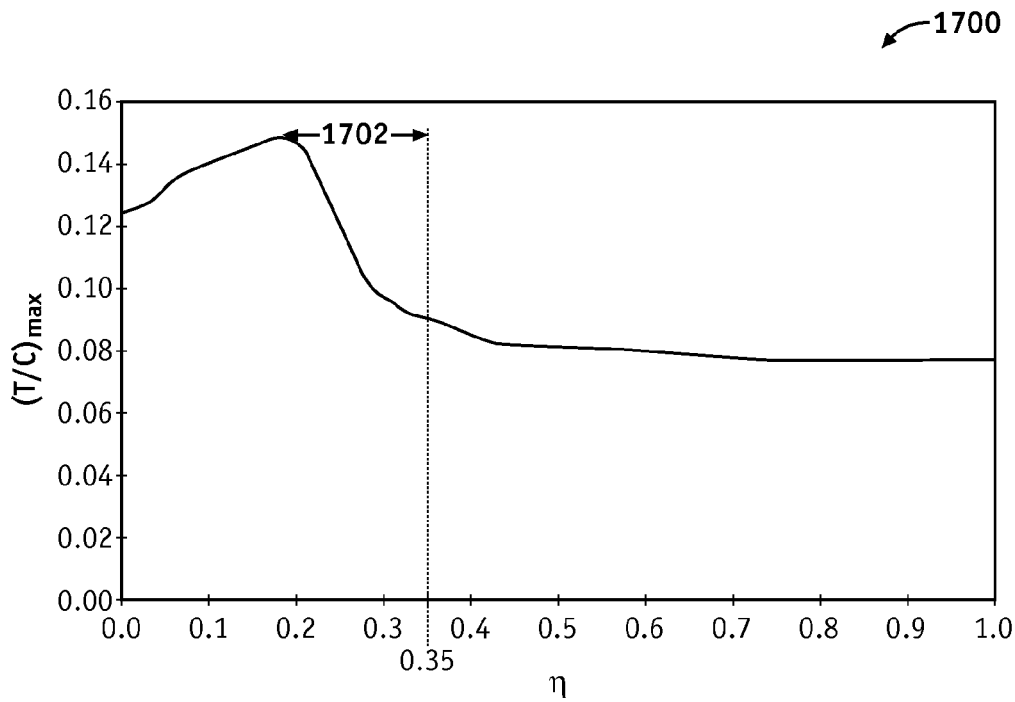
FIG. 17 is an illustration of an exemplary graph showing a maximum thickness distribution from centerline to wing tip according to an embodiment of the disclosure.

FIG. 17 is an illustration of an exemplary graph showing a maximum thickness to chord ratio $(T/C)_{MAX}$ distribution from the centerline 1114 to the wing tip 1110 of the airfoil sections such as the airfoil sections 702-710 according to an embodiment of the disclosure. FIG. 17 shows tailored $(T/C)_{MAX}$ distribution from the centerline 1114 to the wing tip 1110 that encloses the cargo bays 1210/1212 (inboard of approximately 20%, i.e. η<about 0.2), and a transition 1702 to the $(T/C)_{MAX}$ to a more conventional outboard wing (η=0.2 to 0.35). Thickness is high on the inboard wing, which is uncharacteristic of a transonic wing, where the thickness/sweep combination is selected to minimize compressibility drag. However, these substantially high $(T/C)_{MAX}$ ratios are possible at transonic speeds on a BWB aircraft due to the high inboard leading edge sweep, substantial three dimensional flow relief over and around a highly blended body, and long inboard chords (all of which are inherent to BWB configurations). Long inboard chords can lead to low inboard section lift coefficients which in turn can lead to very low compressibility drag.

Figure 18:
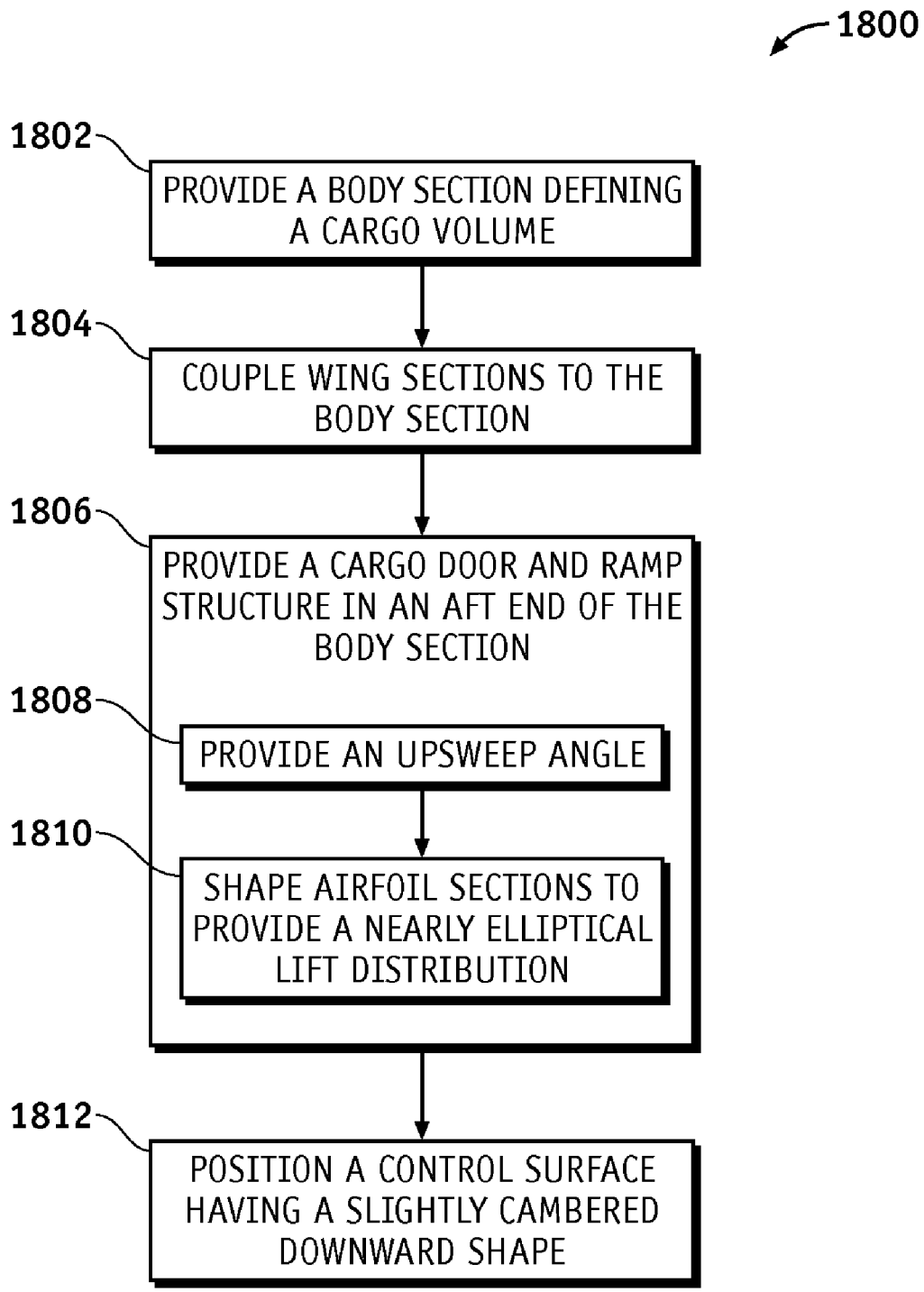
FIG. 18 is an illustration a flow diagram showing an exemplary process for forming a blended wing body cargo aircraft according to an embodiment of the disclosure.

FIG. 18 is an illustration a flow diagram showing an exemplary process for forming a blended wing body cargo aircraft according to an embodiment of the disclosure. The various tasks performed in connection with process 1800 may be performed by software, hardware, firmware, or any combination thereof. For illustrative purposes, the following description of process 1800 may refer to elements mentioned above in connection with FIGS. 1-17. In practical embodiments, portions of process 1800 may be performed by different elements of BWBs 300, 402, and 600-1200 such as the cargo door 306/606/808, cargo ramp 306/608/806/906, the cargo door and ramp structure 604, and the one or more pitch control surfaces 310/610/812/912. Process 1800 may have functions, material, and structures that are similar to the embodiments shown in FIGS. 1-4 and 6-17. Therefore common features, functions, and elements may not be redundantly described here.

Process 1800 may begin by providing a body section 302 defining a cargo volume 1004 such as the inboard cargo bay 1210 and the outboard cargo bays 1212. The outer surface of the lower centerbody 320 of the body section 302 is shaped to provide an aerodynamic lifting surface (task 1802). Process 1800 may then couple the blended wing sections 304 to the body section 302 (task 1804).

Process 1800 may continue by providing a cargo door and ramp structure 604 located in an aft end of the body section 302 and configured to conform to an outer shape of the aerodynamic lifting surface 320 when in a closed position (task 1806). In this manner, an estimate of the distance between the cargo floor 828 and a ground line 820 (e.g., a static ground line when the airplane is parked) is first provided. The distance between the cargo floor 828 and the ground line 820 combined with a substantially maximum acceptable ramp angle 816 (about 9 degrees) when deployed defines a length of the cargo ramp 806 with a height of the toe 814 considered. A vertical distance 826 between the cargo floor 828 and the ground line 820 may be estimated, for example but without limitation, on the basis of a ground clearance of the outer surface of the lower centerbody 320, by a requirement for takeoff rotation such as a requirement for a pitch up that does not scrape aft portions of the BWB 800, and the like.

A certain amount of vertical distance between the cargo ramp 806 and an underside of the cargo door 808 (when open) is generally required. The certain amount of vertical distance may accommodate a straight-out extraction of the cargo 904 by parachute while in flight or it may accommodate a large vehicle entering the center cargo bay 802 via the cargo ramp 806.

Initially, an estimate can be made of a shape of the outer surface of the lower centerbody 320 of the body section 302, the cargo ramp 806 and the cargo door 808, taken at the centerline 1114 (FIG. 11). One consideration may be a structural depth between the cargo floor 828 and the outer surface of the lower centerbody 320 of the body section 302, especially at a point where the cargo ramp 806 hinges to the cargo floor 828 at the hinge 824. As mentioned above, the upsweep 738 may begin, for example but without limitation, near the hinge 824.

Another consideration is an upsweep angle 916 of the closed cargo door and ramp structure 910 (FIG. 9). In this manner, process 1800 may then continue by providing the upsweep angle 916 (task 1808) at aft ends of the airfoil sections 702-710 located at substantially parallel lateral section lines, for example, at about 92.6% 750, about 85.2% 752, about 77.8% 754, about 70.4% 756, about 63% 758 and about 55.6% 760 of the body length 740. The aft ends of the airfoil sections 702-710 form a substantially planar surface. If the upsweep angle 916 is substantially steep, a flow of air along the bottom 918 of the BWB 900 can separate from the cargo ramp 906 or the cargo door 908 surface, leading to undesirable increases in drag. Excessive steepness may also result in a transonic shock that also increases drag. On the other hand, if the closed cargo door and ramp structure 910 upsweep angle 916 is shallow, a length of the cargo door 908 should be long in order to provide a required vertical height between the open cargo door 808 and the cargo floor 828. This may result in an airplane that has more surface area (due to increased overall length), increased drag (due to increased surface area) and increased weight. In contrast, according to an embodiment of the disclosure, the upsweep angle 916 of the closed cargo door and ramp structure 910 is a substantially steepest angle that does not result in separated flow or a transonic shock. The upsweep angle 916 of the BWB 900 is substantially steeper than a corresponding area on an existing BWB that does not have an aft cargo door.

For optimal cargo storage volume, it is advantageous to maintain a relatively steep slope over the width 640 (FIG. 6) of the closed cargo door and ramp structure 910/604. If the relatively steep slope can be smoothly but quickly relieved outboard of the cargo door 908, then the closed cargo door and ramp structure 910 upsweep angle 916 can be somewhat steeper (i.e., because of a "three dimensional relief" effect) than if a steep angle were maintained well outboard of the cargo ramp 906 and boundary of the cargo door 908.

The cross sections (airfoil sections 702-710) in FIG. 7 illustrate the steepness of the closed cargo door and ramp structure 910/604 relative to the neighboring cross sections. For example, the airfoil section 702 represents a cross section at an edge of the cargo door and ramp structure 604. The airfoil section 702 ends with a slender portion (aft portion/pitch control surface 610) comprising the pitch control surface 610. The airfoil section 704 is substantially outboard of the airfoil section 702. As shown in FIG. 7, the airfoil section 704 has a less steep upsweep angle than the airfoil section 702. The airfoil section 706 is outboard of the airfoil section 704 and has even a less upswept angle than the airfoil section 704. The airfoil section 708 is outboard of the airfoil section 706 and has even a less upswept angle than the airfoil section 706. The airfoil section 710 is outboard of the airfoil section 708 and has even a less upswept angle than the airfoil section 708. The airfoil between and beyond the airfoil sections 702-710 may conform to the shape defined by the airfoil sections 702-710.

The cross sections (contour lines 628-638) in FIG. 6 also illustrate this shaping. Because lateral section lines 628-638 (contour lines 628-638) are taken in parallel planes, the steepness of the surface can be estimated by the relative distance of the lateral section lines 628-638. For example, where the lateral section lines 628-638 are farthest apart, the surface is most upswept. Therefore, the upsweep 738 on the lower aft of the centerbody 602 surface is steepest in an area of the cargo door and ramp structure 604. This steepness diminishes smoothly but rapidly outboard of the cargo door and ramp structure 604 boundaries. The airfoil between and beyond the lateral section lines 628-638 may substantially conform to the shape defined by the lateral section lines 628-638.

Process 1800 may continue by conforming a shape of the cargo door and ramp structure 604 to the outer shape of the aerodynamic lifting surface 320 by shaping the airfoil sections 702-710 to provide a nearly elliptical lift distribution (task 1810). As explained above, the airfoil sections may be located, for example, at about ±6.2%, about ±12.4%, about ±18.7%, about ±24.9%, and about ±31.1% of a span of the blended wing body, and have chord line angles to level line of about 3.5, about 2.4, about 0.8, about 1.63, and about 2.62 degrees respectively.

The aft end of the centerbody 302 is shaped to minimize surface area while avoiding flow separation. As mentioned above, the lateral section lines 628-638 through the cargo door and ramp structure 604 are formed to minimize a length of the centerbody 302 in that region. Because the outboard cargo bays 1304 may be shallower in height than the center cargo bay 1306, less of a chord length such as the chord length 742 (FIG. 7) is needed to enclose them. The location of the leading edges 724-732 is determined by a requirement to house the cargo 904 and other considerations (including a need for leading edge sweep). A location of the trailing edges 734 may be driven by the requirement to house the cargo 904 and the other considerations. However, the location of the trailing edges 734 also provides for a smooth transition in chord length (such as the chord length 742) from the centerbody 302 to the outer wing tip 324 at the vertical stabilizers 314. The smooth transition in chord length is especially important in the region 642 between the airfoil section 706 of the centerbody 302 and the airfoil section 710 of the blended wing sections 304. This smooth transition facilitates an elliptical lift distribution by permitting a smoothly transitioning combination of airfoil camber and incidence.

In this manner, a desired span-wise lift distribution can be achieved by tailoring a suitable combination of chord, incidence and camber of the airfoil sections such as the airfoil section 702-710. Local increases in each of these result in increased local lift. Thus, a given amount of local lift may be achieved with a large chord and small incidence and vice-versa. In this manner, airfoil camber may be adjusted by changing one or more of the geometric parameters (mentioned above) of the airfoil section 702-710 to cause a suitable asymmetry in a shape of the centerbody 302 and the blended wing sections 304 to influence specific aerodynamic characteristics of the BWB 300. If camber is increased to achieve some specific objective, local lift may be maintained by reducing incidence. These characteristics are interactive and may be considered holistically in a design. The holistic portion of the analysis can be done using computation fluid dynamics (CFD).

Process 1800 may continue by positioning a pitch control surface 610 having a slightly cambered downward 736 shape substantially near an aft end of the cargo door and ramp structure 604 (task 1812). The pitch control surface 610 is configured to trim the BWB 300 in pitch (longitudinal trim). The outer wings of a typical BWB may tend to pitch the typical BWB nose down at cruise lift coefficients. The centerbody airfoil sections are typically shaped with little, no or negative aft camber to provide a nose-up trimming moment.

As mentioned above, a substantially sharp upsweep of a central ramp and door region of an existing cargo airplane can result in a lower lift region in this area of the lift distribution. The lower lift region in the lift distribution can result in significantly reduced aerodynamic efficiency. In contrast, according to an embodiment of the disclosure, the lower lift region is optimized by the addition of a slender, positively-cambered extension (aft portion/pitch control surface 610) of the airfoil sections such as the airfoil sections 702-710 over the width 640 of the cargo door and ramp structure 604 plus a smooth transition region outboard to obtain the pitch control surface 610. This positively cambered region (aft portion/pitch control surface 610) reduces the nose-up trim that is provided, so a fairly rapid transition to a conventional trailing edge is provided herein. Without the positively cambered extension, there can be a reduction in lift that can be recaptured with increased airfoil incidence. This is reflected in the down sweep of the trailing edges 734 as it moves outboard (i.e., in the direction from the airfoil section 702 to 710) as seen in FIG. 6 and FIG. 7. A requirement to enclose the cargo 904 in a forward portion of the centerbody 302 necessitates a smooth (straight) centerbody 302 leading edge 322 as seen in FIG. 3. Because of this requirement, changes in airfoil incidence are made by pivoting the airfoil sections 702-710 about the leading edges 724-732 respectively, resulting in substantially large deflections in the trailing edges 734.

The central upsweep 738 is as steep as may be possible without separation of airflow over the wing/fuselage. Upsweep steepness can be increased by rapidly reducing steepness outboard of the cargo door 606. The positively cambered trailing edges 734 extension aft the cargo door and ramp structure 604 can substantially recover lift that may be lost to reduced airfoil incidence (and the upsweep) but may result in a reduced pitch trim contribution. Thus, the airfoils sections 704-710 outboard of the cargo door 606 additionally increase incidence and lower-aft steepness, which increases a lift provided by the airfoils sections (e.g., 702-710) outboard of the cargo door 606 without a need for a cambered trailing edge extension. The positively cambered trailing edges 734 and the airfoils sections outboard of the cargo door 606 can assist in providing nose-up longitudinal trim.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 9-16 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A blended wing body cargo aircraft comprising:
 a body section defining a cargo volume, an outer surface of the body section shaped to provide an aerodynamic lifting surface comprising a lift coefficient increasing smoothly near a center of the body section;
 a cargo door and ramp structure located in an aft end of the body section and an outer shape of the aerodynamic lifting surface is shaped to conform with the cargo door and ramp structure and to form a steep upsweep preserving an aerodynamic efficiency of the blended wing body cargo aircraft when the cargo door and ramp structure is in a closed position; and
 at least one pitch control surface having a slightly cambered downward shape, and positioned near an aft end of the cargo door and ramp structure such that an efficient lift distribution is maintained while providing pitch control.

2. The blended wing body cargo aircraft according to claim 1, further comprising a plurality of wing sections coupled to the body section.

3. The blended wing body cargo aircraft according to claim 1, wherein the cargo door and ramp structure comprises substantially parallel contour lines forming a substantially planar surface through at least one of the group consisting of: about 92.6%, about 85.2%, about 77.8%, about 70.4%, about 63%, and about 55.6% of a length of the blended wing body cargo aircraft.

4. The blended wing body cargo aircraft according to claim 1, wherein the upsweep on the aft end of the body section provides cargo clearance.

5. The blended wing body cargo aircraft according to claim 1, wherein the at least one pitch control surface is cambered downward by about two degrees relative to a level line.

6. The blended wing body cargo aircraft according to claim 1, wherein:
an angle of a cargo ramp of the cargo ramp and door structure is about 9 degrees from a ground line when deployed, and
a toe extension of the cargo ramp of the cargo door and ramp structure is about 13 degrees from the ground line when deployed.

7. The blended wing body cargo aircraft according to claim 1, wherein the outer shape of the aerodynamic lifting surface is conformed to the cargo door and ramp structure by shaping a plurality of airfoil sections that form the blended wing body cargo aircraft.

8. The blended wing body cargo aircraft according to claim 7, wherein:
the airfoil sections are located at about ±6.2%, about ±12.4%, about ±18.7%, about ±24.9% and about ±31.1% of a span of the blended wing body cargo aircraft, and
the airfoil sections have chord line angles to a level line of about 3.5, about 2.4, about 0.8, about 1.63, and about 2.62 degrees respectively.

9. The blended wing body cargo aircraft according to claim 7, wherein the cargo door and ramp structure is bounded by the airfoil sections located at about ±6.2% of a span of the blended wing body cargo aircraft.

10. The blended wing body cargo aircraft according to claim 7, wherein the at least one pitch control surface comprising the slightly cambered downward shape is provided by an addition of slender extensions at trailing edges of the airfoil sections over a width of the cargo door and ramp structure plus a smooth transition region outboard.

11. An aerodynamic lifting body comprising:
a plurality of airfoil sections located at respective span locations of the aerodynamic lifting body and enclosing a cargo volume, the airfoil sections shaped to provide an aerodynamic lifting surface comprising a lift coefficient increasing smoothly near a center of the aerodynamic lifting body;
a cargo door and ramp structure located in aft ends of the airfoil sections, outer contours of the airfoil sections shaped to conform with the cargo door and ramp structure forming a steep upsweep preserving an aerodynamic efficiency of the aerodynamic lifting body when the cargo door and ramp structure is in a closed position; and
at least one pitch control surface having a slightly cambered downward shape, and comprising trailing edges of the airfoil sections and operable to provide pitch control such that an efficient lift distribution is maintained.

12. The aerodynamic lifting body according to claim 11, wherein a width of the cargo door and ramp structure is within about ±6.2% of a span of the aerodynamic lifting body.

13. The aerodynamic lifting body according to claim 11, wherein:
the airfoil sections are located on at least one of the group consisting of: about ±6.2%, about ±12.4%, about ±18.7%, about ±24.9%, and about ±31.1% of a span of the aerodynamic lifting body, and
the airfoil sections have chord line angles to a level line of about 3.5, about 2.4, about 0.8, about 1.63, and about 2.62 degrees respectively.

14. The aerodynamic lifting surface according to claim 11, wherein the aft ends of the airfoil sections are upswept at substantially parallel lateral contour lines located at at least one of the group consisting of: about 92.6%, about 85.2%, about 77.8%, about 70.4%, about 63% and about 55.6% of a length of the aerodynamic lifting body.

15. The aerodynamic lifting surface according to claim 11, wherein:
an angle of a cargo ramp of the cargo door and ramp structure is about 9 degrees from a ground line when deployed, and
a toe extension of a cargo ramp of the cargo door and ramp structure is about 13 degrees from the ground line when deployed.

16. A method of forming a blended wing body cargo aircraft, the method comprising:
providing a body section defining a cargo volume, an outer surface of the body section shaped to provide an aerodynamic lifting surface comprising a lift coefficient increasing smoothly near a center of the body section;
providing a cargo door and ramp structure located in an aft end of the body section, an outer shape of the aerodynamic lifting surface shaped to conform with the cargo door and ramp structure and to form a steep upsweep when the cargo door and ramp structure is in a closed position; and
positioning at least one control surface having a slightly cambered downward shape near an aft end of the cargo door and ramp structure.

17. The method of claim 16, further comprising coupling a plurality of wing sections to the body section.

18. The method of claim 16, further comprising conforming a shape of the cargo door and ramp structure with the outer shape of the aerodynamic lifting surface by shaping a plurality of airfoil sections that form the blended wing body cargo aircraft to provide a nearly elliptical lift distribution.

19. The method of claim 18, further comprising providing an upsweep angle of the steep upsweep at aft ends of the airfoil sections located at substantially parallel lateral section lines at at least one of the group consisting of: about 92.6%, about 85.2%, about 77.8%, about 70.4%, about 63% and about 55.6% of a length of the body section, wherein the aft ends of the airfoil sections form a substantially planar surface.

20. The method of claim 18, wherein:
the airfoil sections are located at one of the group consisting of: about ±6.2%, about ±12.4%, about ±18.7%, about ±24.9%, and about ±31.1% of a span of the blended wing body, and
the airfoil sections have chord line angles to a level line of about 3.5, about 2.4, about 0.8, about 1.63, and about 2.62 degrees respectively.

21. An aerodynamic lifting body comprising:
a plurality of airfoil sections located at respective span locations of the aerodynamic lifting body and enclosing a cargo volume;
a cargo door and ramp structure located in aft ends of the airfoil sections and shaped to conform with outer contours of the airfoil sections when in a closed position, the airfoil sections are located on at least one of the group consisting of: about ±6.2%, about ±12.4%, about ±18.7%, about ±24.9% and about ±31.1% of a span of the aerodynamic lifting body, and the airfoil sections have chord line angles to a level line of about 3.5, about 2.4, about 0.8, about 1.63 and about 2.62 degrees respectively; and
at least one pitch control surface having a slightly cambered downward shape, and comprising trailing edges of the airfoil sections and operable to provide pitch control.

* * * * *